United States Patent [19]

Berben et al.

[11] Patent Number: 5,037,629

[45] Date of Patent: Aug. 6, 1991

[54] PROCESS FOR THE SELECTIVE OXIDATION OF GASEOUS SULFUR-CONTAINING COMPOUNDS, HYDROGEN SULFIDE IN PARTICULAR, TO FORM ELEMENTAL SULFUR

[75] Inventors: Pieter H. Berben, Ziest; John W. Geus, Bilthoven, both of Netherlands

[73] Assignees: Veg-Gasinstituut N.V., Apeldoorn; Comprimo B.V., Amsterdam, both of Netherlands

[21] Appl. No.: 282,196

[22] Filed: Dec. 9, 1988

Related U.S. Application Data

[62] Division of Ser. No. 37,590, Apr. 13, 1987, Pat. No. 4,818,740.

[30] Foreign Application Priority Data

Apr. 16, 1986 [NL] Netherlands ............... 8600959

[51] Int. Cl.⁵ .......................................... C01B 17/04
[52] U.S. Cl. ................................ 423/576.8; 423/224
[58] Field of Search ............... 423/576, 576.8, 224; 502/257, 258, 313, 314, 336, 338

[56] References Cited

U.S. PATENT DOCUMENTS

| | | | |
|---|---|---|---|
| 2,083,894 | 6/1937 | Connolly | 423/576.8 |
| 2,083,895 | 6/1937 | Connolly | 423/576.8 |
| 2,971,824 | 2/1961 | Johnson et al. | 585/823 |
| 3,393,050 | 7/1968 | Hunt et al. | 423/574 R |
| 3,781,445 | 12/1973 | Moss et al. | 423/574 R |
| 3,867,313 | 2/1975 | Brewer | 423/224 |
| 3,870,657 | 3/1975 | Pitzer | 502/338 |
| 3,987,154 | 10/1976 | Lagas | 423/574 |
| 4,088,736 | 3/1978 | Courty et al. | 423/230 |
| 4,123,507 | 10/1978 | Hass | 423/573 |
| 4,197,277 | 4/1980 | Sugier et al. | 502/335 |
| 4,233,276 | 11/1980 | D'Souza et al. | 423/230 |
| 4,243,647 | 1/1981 | Hass et al. | 423/573 |
| 4,278,646 | 7/1981 | Lynn et al. | 423/576.6 |
| 4,279,882 | 7/1981 | Beavon | 423/574 |
| 4,311,683 | 1/1982 | Hass et al. | 423/230 |
| 4,313,820 | 2/1982 | Farha, Jr. et al. | 208/213 |
| 4,363,790 | 12/1982 | Anderson et al. | 423/230 |
| 4,399,112 | 8/1983 | Voirin | 423/230 |
| 4,427,576 | 1/1984 | Dupin | 502/218 |
| 4,519,992 | 5/1985 | Alkhazov et al. | 423/230 |
| 4,526,590 | 7/1985 | Palm et al. | 55/27 |
| 4,576,925 | 3/1986 | Alkhazov et al. | 502/307 |
| 4,629,612 | 12/1986 | van der Wal et al. | 423/244 |

FOREIGN PATENT DOCUMENTS

| | | |
|---|---|---|
| 0085213 | 8/1983 | European Pat. Off. |
| 0091551 | 9/1983 | European Pat. Off. |
| 6901632 | 8/1969 | Netherlands |
| 176160 | 4/1975 | Netherlands |
| 7603622 | 10/1977 | Netherlands |

OTHER PUBLICATIONS

L. C. Hardison, Chemical Engineering, pp. 62–63, Jan. 1985.
L. C. Hardison, Hydrocarbon Processing, pp. 70–71, Apr. 1985.
R. H. Hass et al, Hydrocarbon Processing, pp. 104–107, May 1981.
KTI Manufacturer's publication on Lo–Cat Liquid Catalytic Oxidation Systems.
A. J. Moyes and J. S. Wilkinson, The Chemical Engineer, pp. 84–90, Feb. 1974.

(List continued on next page.)

*Primary Examiner*—Jeffrey E. Russel
*Attorney, Agent, or Firm*—Weingarten, Schurgin, Gagnebin & Hayes

[57] ABSTRACT

The claimed invention relates to a catalytic process for the selective oxidation of sulfur-containing compounds, in particular hydrogen sulfide, to form elemental sulfur. The catalyst includes a carrier of which the surface exposed to the gaseous phase does not exhibit alkaline properties under the reaction conditions, and a catalytically active material applied thereto or formed thereon. The specific surface area of the catalyst is less than 20 $m^2/g$ catalyst, with less than 10% of the total pore volume having a pore radius between 5 and 500 Å. A process for preparing the catalyst is also disclosed.

3 Claims, 1 Drawing Sheet

OTHER PUBLICATIONS

British Crown, copyright 1980, Temperature Programmed Reduction.

Catalytic Oxidation of $H_2S$ Over Different Porous Materials: Influence of the Pore Structure and the Chemical Composition of the Materials, Ind. Eng. Chem., Prod. Res. Dev., 16, p. 35 (1977).

Ross and Jeanes, Oxidation of $H_2S$ Over Cobalt Molybdate and Related Catalysts, Ind. Eng. Chem., Prod. Res. Dev., 13(2), p. 102 (1974).

"Tail Gas Clean-Up Process, A Review", B. G. Goar, 33rd Annual Gas Conditioning Conference, Norman, Okla., Mar. 7-9, 1983.

Cook and Ross, The Heterogeneous Oxidation of $H_2S$ at Concentrations Below 1000 ppm in $N_2$/Air Mixtures Over Supported Metal Oxide Catalysts, Atmos. Environ., 7, p. 145 (1973).

"Capability of the Modified Claus Process", H. G. Paskall, publ.: Western Research & Development, Calgary, Alberta, Canada (1979).

"Gas and Liquid Sweetening", R. N. Maddox, Campbell Petroleum Series (1979), pp. 239-243; and p.280 (Haines Process).

Catal. Rev. Sci. Eng. 24(2), 233-309 (1982), Hurst et al,

PROCESS FOR THE SELECTIVE OXIDATION OF GASEOUS SULFUR-CONTAINING COMPOUNDS, HYDROGEN SULFIDE IN PARTICULAR, TO FORM ELEMENTAL SULFUR

This application is a division of application Ser. No. 07/037,590, filed Apr. 13, 1987, now U.S. Pat. No. 4,818,740.

This invention relates to a catalyst for the selective oxidation of hydrogen sulfide to elemental sulfur; to a process for the preparation of the catalyst; and to a process for the selective oxidation of hydrogen sulfide to elemental sulfur.

The need to purify gases treated in chemical processes, supplied to customers, or discharged to the atmosphere, from sulfur compounds, in particular hydrogen sulfide, is well known. Indeed, a number of processes for removal of hydrogen sulfide from gas are known.

In some of these processes, hydrogen sulfide is first concentrated by means of a liquid absorbent, whereafter the regenerated $H_2S$ gas is converted into elemental sulfur, which is not harmful. In certain cases it is possible to omit the first step, i.e., concentrating the hydrogen sulfide, and to convert it directly into elemental sulfur. A requisite in many of these cases, then, is that the components in the gas which do not contain sulfur are not reacted. Such a process is called a selective oxidation process.

One of the best known methods of converting hydrogen sulfide to elemental sulfur is the so-called Claus process.

The Claus process is carried out in various ways, depending on the hydrogen sulfide content in the gas being treated. In one embodiment a portion of the hydrogen sulfide is combusted to form sulfur dioxide, which then reacts further with the remaining hydrogen sulfide to form elemental sulfur. A detailed description of the Claus process is to be found in R. N. Maddox, 'Gas and Liquid Sweetening'; Campbell Petroleum Series (1977), p. 239-243, and also in H. G. Paskall, 'Capability of the Modified Claus Process', publ.: Western Research & Development, Calgary, Alberta, Canada (1979).

In the Claus process, however, the $H_2S$ is not quantitatively converted into elemental sulfur, mainly as a result of the fact that the Claus reaction is not quite completed:

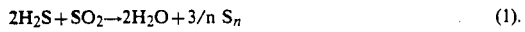

Accordingly, there are remaining amounts of $H_2S$ and $SO_2$. Now, the effluence of the $H_2S$ containing residual gas is not permitted, so that this has hitherto been combusted, whereby the hydrogen sulfide and other sulfur compounds, and also the elemental sulfur present in the gaseous phase are oxidized to form sulfur dioxide. As environmental requirements are becoming stricter, this will no longer be permitted, in view of the too high emission of sulfur dioxide that would result. It is therefore necessary to process the residual gas of the Claus installation, the so-called tail gas, further in a so-called tail gas plant.

Tail-gas processes are known to those skilled in the art and described, inter alia, in NL-A-7104155 and in B. G. Goar, 'Tail Gas clean-up processes, a review', paper at the 33rd Annual Gas Conditioning Conference, Norman, Okla., Mar. 7-9, 1983.

The best known and hitherto most effective process for the treatment of tail gas is the SCOT process. This process is described, for example, in Maddox, 'Gas and liquid sweetening' (1977), publ. Campbell Petroleum Series, p. 280. In this process, the tail gas is passed with hydrogen over a cobalt molybdenum on $Al_2O_3$ catalyst, whereby the $SO_2$ present is catalytically reduced. The total quantity of $H_2S$ is subsequently separated in the usual way by liquid absorbtion. This requires previous conversion of $SO_2$ to $H_2S$, as the presence of $SO_2$ is a very disturbing factor. One disadvantage of the SCOT process is, therefore, the need of using complicated equipment. A further disadvantage is the high energy consumption needed to regenerate the hydrogen sulfide from the absorbent.

Another possibility of converting hydrogen sulfide in tail gas to elemental sulfur is the so-called BSR Selectox process, which is described in U.S. Pat. No. 4,311,683.

In that process, the $H_2S$ containing gas is mixed with oxygen and passed over a catalyst containing vanadium oxides and vanadium sulfides on a non-alkaline, porous, refractory oxidic carrier. The conversion is carried out at a temperature of between 121° and 232° C.

A major drawback of both the SCOT process and the BSR Selectox process is that in both cases, after the hydrogenation of the sulfur components present to $H_2S$, the tail gas must first be cooled to remove the major part of the water. In fact, water greatly interferes with the absorption and oxidation of $H_2S$. Owing to the high investments involved, the cost of the tail gas treated by these known processes is high.

Another process for the oxidation of $H_2S$ to elemental sulfur is described in U.S. Pat. No. 3,393,050. According to that publication, the hydrogen sulfide containing gas is passed with an oxidixing gas over a suitable catalyst contained in the tubes of a so-called tubular reactor, with the tubes being externally cooled. The catalyst considered suitable is bauxite, aluminum oxide (gamma alumina) or aluminum silicate as described in U.S. Pat. No. 2,971,824. Apart from the disadvantages mentioned above, the effectiveness of this process, just as of the other known oxidation processes, is insufficient. Thus, for example, the data given in U.S. Pat. No. 4,311,683 show that the formation of $SO_2$ cannot be avoided, in spite of the low temperature that is used. In view of the ratio of $H_2S$ to $SO_2$ found in the 'product gas' it must be supposed that this formation of $SO_2$ is at least partially connected with the at least partial establishment of the Claus equilibrium. Indeed, it is in particular the occurrence of the following side-reactions which adversely affect the effectiveness:

1. The continued oxidation of sulfur:

2. The reverse (or rather reversing) Claus reversible reaction:

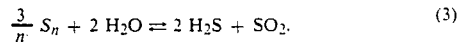

In it the sulfur once formed reacts with the water vapour that is also present to form hydrogen sulfide and sulfur dioxide.

3. The so-called sulfation of the catalyst, for example:

$$MeO + SO_2 + \tfrac{1}{2}O_2 \rightarrow MeSO_4 \qquad (4)$$

As a result of this reaction, metal oxides present in the catalyst are converted into sulfates, whereby the catalytic activity is reduced, sometimes even to a substantial extent.

4. The formation of $SO_3$ (over certain metal oxides) according to $SO_2 + \tfrac{1}{2}O_2 \rightarrow SO_3$ \qquad (5)

5. Pore condensation of sulfur formed in the catalyst bed, mainly owing to condensation in the catalyst pores (so-called capillary condensation) which may occur above the sulfur dew point.

The occurrence of the side reactions listed above is partially determined by conditions in practice.

Generally speaking, tail gas contains in addition to elemental sulfur a considerable concentration of water vapour, which concentration may range between 10 and 40% by volume. This water vapour greatly promotes the reversing Claus reaction. Substantial removal thereof has evident technological disadvantages, such as the need of an additional cooling/heating stage, an additional sulfur recovery stage, or a hydrogenation stage followed by a (water removing) quench stage. A process in which the selectivity is not affected by the water content of the gas would therefore be highly desirable.

Another important circumstance is that in selective oxidation processes, some excess of oxygen will generally be used, not only to prevent $H_2S$ from 'slipping through', but also on the ground of considerations of control technology. It is this very excess of oxygen, however, which will give rise to the continued oxidation of the elemental sulfur formed, whereby the effectiveness of the process is adversely affected.

It is an object of the present invention to provide a catalyst for the selective oxidation to elemental sulfur, the use of which substantially prevents the side reactions referred to, while the main reaction $H_2S + \tfrac{1}{2}O_2 \rightarrow H_2O + 1/n\, S_n$ (6) takes place with a sufficient degree of conversion and selectiveness.

It is noted in this connection that the term 'selective' has a more sharply defined meaning for the catalyst according to the present invention, namely, that it virtually only brings about the conversion into elemental sulfur, by the direct reaction with oxygen. In that sense, the catalysts of the state of the art, as discussed above, cannot be called selective.

The catalyst according to the invention comprises a carrier in which the surface exposed to the gaseous phase does not, under the reaction conditions, exhibit alkaline properties with a catalytically active component applied thereto, with the specific area of the catalyst being less than 20 m²/g catalyst, and less than 10% of the total pore volume having a pore radius of between 5 and 500 Å. The catalyst generally contains at least 0.1% by weight, calculated on the total mass of the catalyst, of a material that is catalytically active for the selective oxidation of $H_2S$ to elemental sulfur. The catalytically active material used is preferably a metal oxide, a mixed oxide of a plurality of metals or a mixture of metal oxides.

BRIEF DESCRIPTION OF THE DRAWINGS

The invention will be better understood from a consideration of the following detailed description taken in conjunction with the drawings in which.

DETAILED DESCRIPTION

Figure 1:
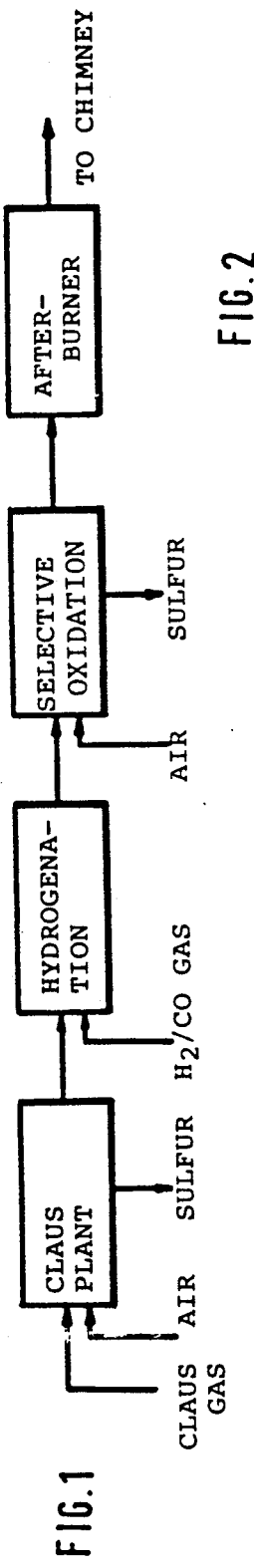
FIGS. 1–4 are block diagrams of the Claus plant process discussed, respectively, in Examples III–VI.

It is known from the literature that alkaline sites on the catalyst surface accelerate the establishment of the equilibrium of the Claus reaction:

$$3/n\, S_n + 2H_2O \rightarrow 2H_2S + SO_2.$$

Whereas the hydrogen sulfide formed is rapidly oxidized, sulfur dioxide is stable. Accordingly, when the equilibrium in the Claus reaction is established, the gas at the outlet of the reactor will contain sulfur dioxide. As this detracts from the desired selectivity, the catalyst according to the invention must contain no or substantially no alkaline sites in the surface exposed to the gaseous phase. The presence of such sites appears from the establishment of the equilibrium in the Claus reaction, which is readily determined by analysis of the gas mixture exiting from the reactor. According to the invention, therefore, the carrier is selected so that its surface either contains no or substantially no alkaline sites or contains alkaline sites completely or substantially completely covered by the active component. Naturally, the distribution of the active component over the carrier must not be changed under the reaction conditions to such an extent that alkaline sites are again exposed.

It has been found that, by using the catalyst according to the present invention, the undesirable side reactions referred to hereinbefore can be avoided to a great extent. Without wishing to be bound by any theory, we assume that, in narrow deep pores present in many catalyst carriers, the sulfur formed and diffusing to the outside easily reacts further with oxygen diffusing inwardly to form sulfur dioxide. This might explain why this reaction does not occur in a catalyst of the present invention, namely, because there are insufficient narrow deep pores. The absence or substantial absence of the Claus reaction in a catalyst according to the invention, too, could be explained by supposing that, in view of the low specific area, there are insufficient active sites, or none at all, to promote the (reversing) Claus reaction.

It is noted that it has not so far been recognized that the occurrence of the Claus reaction is counterproductive in oxidation processes for hydrogen sulfide, and should therefore be prevented. Thus, for example, in U.S. Pat. No. 3,393,050, cited above, it is observed that sulfur dioxide can be used as the oxidant. This can only be done, however, if the catalyst used promotes the Claus reaction and hence the reversing Claus reaction. As under the process conditions, the Claus reaction cannot be irreversible as can be shown thermodynamically, a quantitative conversion of $H_2S$ into elemental sulfur is therefore basically impossible.

The use of the catalyst according to the present invention offers a substantial solution to this problem, because, as explained hereinbefore, the Claus equilibrium is not established. Accordingly, in selective $H_2S$ oxidation processes using the catalyst of the present invention, the use of oxygen, for example, in the form of air oxygen, is essential.

The conditions of a specific area less than 20 m²/g and a low microporosity as defined for the catalyst according to the present invention are highly unusual in the science and technology of catalysis. On the contrary it is generally held that to avoid large volumes of catalyst with a desired activity of the catalyst bed, high-area carriers of high porosity are preferable. In the catalyst according to the present invention this should be definitely avoided, so that only very specific catalysts are suitable for the purposes of the present invention.

In the preparation of the catalyst, this must be taken into account in two respects.

1. In the selection of the starting materials; and in the preparation procedure.

The preferred starting material will therefore be a carrier which already has a low specific area itself. Suitable materials for such carriers are metals and metal alloys which are stable under the reaction conditions. Examples are metals such as iron, chromium or nickel or alloys containing one or more of these metals. To bring the catalyst carrier into a suitable form, it may, if necessary, be subjected to a preliminary treatment.

The pore distribution, for example, given by means of a histogram can be used to determine whether the carrier is suitable for the purposes of the present invention. During the application of the active component, this specific area must not be essentially increased.

Finally, if desired, a sintering treatment can also be carried out with the ready catalyst, whereby micropores are sintered away.

The criteria given with regard to the pore distribution and the specific area are of great importance for the results to be achieved in the process, in particular for the selectivity and degree of conversion to be achieved.

For these reasons, further requirements may be imposed upon the catalyst parameters. Preferably the specific area of the catalyst will not exceed 10 $m^2/g$ catalyst, while especially with a specific catalyst area of less than 7 $m^2/g$ catalyst excellent results are obtained.

The substantial absence of micropores, too, is of importance with regard to the results to be obtained with the catalyst: preferably, no more than 2% of the total pore volume should occur in the form of pores having a radius ranging between 5 and 500 Å.

A particularly suitable carrier is alpha-alumina, but silica whose specific area satisfies the above requirements, such as, for example, hydrothermally sintered silica, is also suitable for use.

The above carriers are, in principle, ceramic materials which do not give an alkaline reaction. It is quite possible, however, to use other materials which do not give an alkaline reaction under the reaction conditions and are thermostable. Examples are thermostable, non-ceramic materials, such as metal mesh structures, surfaces of (incompletely) sintered materials, metal mouldings, packing bodies ('Raschig rings', etc.) and so on. Highly suitable is a honeycomb structure of high thermal conductivity.

Suitable materials for such carriers are the various metal alloys which are substantially stable under the reaction conditions. Examples are metals such as Fe, Cr or Ni or alloys containing one or more of these metals.

As stated above, suitable catalytically active materials are a metal oxide, an oxide of a plurality of metals or a mixture of metal oxides. Preferably the catalytically active material used is an iron oxide or an oxide of iron and chromium. A suitable Cr:Fe molar ratio is less than 0.5 and preferably between 0.02 and 0.15.

The catalytically active material is present on the carrier in a proportion of 0.05–10% by weight, calculated on the total mass of the catalyst. The active component is preferably present on the carrier in a proportion of more than 1% by weight, calculated on the total weight of the catalyst. Best results were obtained using catalysts in which this content was between 3 and 10% by weight, calculated as the weight of the metal oxide or the mixed oxide of two or more metals and calculated on the total weight of the catalyst.

It should be emphasized in this connection that we are here concerned with the active material present on the carrier. In fact, as a result of a sintering treatment, or from a different method of preparation, a portion of the active material, in particular the metal oxide, may become encapsulated within the carrier, for example, when narrow pores are sealed during the sintering treatment. The difference between this encapsulated or embedded metal oxide and metal oxide present on the carrier, however, can be readily determined by means of so-called temperature programmed reduction (TPR). Details of this measuring technique are described in N. W. Hurst, S. J. Gentry, A. Jones and B. D. McNicol Catal. Rev. Sci. Eng. 24(2), 233–309 (1982). The amount of metal oxide present on the carrier and accessible to gases can thus be determined.

In principle, the catalysts according to the invention can be prepared using known methods for the preparation of supported catalysts. During such preparation, however, in view of the unusually small specific area and low microporosity of the catalysts according to the invention, specific measures must be taken, in particular, during the preparation the porosity must not be increased.

Particular care is required in homogeneously applying the catalytically active material to the carrier material, while in addition it should be ensured that this homogeneity is maintained during and after the drying procedure.

In order to satisfy these requirements, in one possible method of preparing the catalyst according to the invention, a powdered porous carrier material with a low specific area is impregnated in dry condition with a complex solution. This method is known by the name of 'incipient wetness impregnation'. Preferably due care is exercised therein. Previously the pore volume of the carrier is determined. Subsequently, the carrier is impregnated with a volume of the complex solution that is equal to or, preferably, slightly less than, the pore volume of the carrier. The complex solution contains the cations of the active material complexed with an organic molecule in the solution. To this solution, an amount of a viscosity-increasing compound, such as hydroxy-ethyl cellulose, may be added. By impregnating the carrier material with this complex solution by the incipient wetness method a low-area catalyst is obtained, to which the active material is applied highly homogenously and in which the microporosity has not increased as compared with the starting carrier material.

During the drying procedure, the temperature should be increased very slowly to maintain homogeneity. Electron micrographs, porosimetry measurements, B.E.T. measurements and reactor experiments show that the catalysts satisfy the requirements with regard to texture.

In case a catalyst on a non-ceramic carrier is used, the catalytically active material can be applied to the carrier in known manner.

The invention also relates to a process for selectively oxidizing sulfur-containing compounds, in particular hydrogen sulfide, to elemental sulfur, using the catalyst according to the present invention.

In this process, hydrogen sulfide is oxidized directly to elemental sulfur by passing a hydrogen sulfide containing gas together with an oxygen containing gas over the catalyst at elevated temperature.

It is observed that, for optimum results, not only is the structure of the catalyst determinative, but so are the process variables. In particular, the temperature, contacting period, and excess of oxygen selected are of importance for the oxidation. The oxidation process is carried out by adding to the hydrogen sulfide containing gas, using a known per se ratio regulator, oxygen or an oxygen containing gas in such a quantity that the molar ratio of oxygen to hydrogen sulfide ranges between 0.5 and 5.0 and preferably between 0.5 and 1.0.

The process according to the present invention can be used for the selective oxidation of all gases which contain sulfur containing compounds, in particular hydrogen sulfide. Examples of processes in which the oxidation according the invention can be suitably applied are the processes as described in European patent application 91551, European patent application 78690, and U.S. Pat. No. 4,311,683.

The process according to the invention is excellently suitable for oxidizing gas containing no more than 1.5% of $H_2S$, as it is then possible to use a normal, adiabatic reactor.

In the oxidation, the inlet temperature of the catalyst bed is selected to be in excess of 150° C., and preferably in excess of 170° C. This temperature is partially determined by the requirement that the temperature of the catalyst bed must be above the dewpoint of the sulfur formed. Using known per se measures, the maximum temperature in the catalyst bed is maintained below 330° C. and preferably below 300° C. When the $H_2S$ content is higher than 1.5%, it may be necessary to take measures to prevent that, owing to the reaction heat released, the temperature in the oxidation reactor becomes too high. Such measures comprise, for example, the use of a cooled reactor, for example, a tubular reactor in which the catalyst is contained in a tube surrounded by a coolant. Such a reactor is known from European patent 91551. It is also possible to use a reactor incorporating a cooling element. Furthermore the gas being treated may be returned to the reactor inlet after cooling, whereby an extra dilution of the gas to be oxidized is achieved, or alternatively, the gas to be oxidized may be distributed over a plurality of oxidation reactors, simultaneously distributing the oxidation air over the various reactors. In a particular embodiment of the process according to the invention, the catalyst is used as a fluid medium in a fluid-bed reactor, preventing short-circuiting by applying one or more apertured plates. In this way optimum heat transfer is ensured. In another particular embodiment the catalyst is used in the form of solid, for example, honeycomb structures of high thermal conductivity whereby an undue rise in temperature of the catalyst is also suitably prevented.

The process according to the invention can be used with particular advantage for the selective oxidation of the hydrogen sulfide containing residual gases from a Claus plant. Apart from the very high selectivity of the catalyst according to the invention, the important advantage is obtained that the removal of water prior to the oxidation is no longer needed. When the residual gases are oxidized, using the process according to the present invention, these are preferably first passed through a hydrogenation reactor containing, for example, a cobalt molybdenum containing catalyst, and in which all sulfur components are hydrogenated to form hydrogen sulfide.

According to a variant of the process according to the invention, the selective oxidation stage using the catalyst according to the invention is combined with a subsequent hydrogenation stage, followed by absorption of hydrogen sulfide, all this as described in European patent application 71983. In this way, 98% of the sulfur compounds present is removed in the section preceding the hydrogenation, so that the hydrogenation stage and the absorption mass are not unduly loaded. In this way, sulfur recovery percentages up to 100 can be reached. In a variant of this process the hydrogenation stage is followed by another selective oxidation according to the invention, instead of the absorption stage, whereby an overall sulfur recovery percentage of between 99.5 and 99.8 is obtained.

Furthermore, the process according to the invention is particularly suitable for desulfurizing, for example, fuel gases, refinery gases, biogas, coke furnace gas, gaseous effluents from chemical plants such as viscose factories or gases burnt off at gas and/or oil winning sites. Furthermore, the catalyst according to the invention can be used as a protective layer in Claus reactors to protect the normal Claus catalyst from being sulfated. The catalyst then serves to cause small amounts of oxygen to react with $H_2S$ to form sulfur, and sulfate formation in the Claus catalyst is thus prevented.

When, in the process according to the invention, the sulfur vapour containing gas from the selective oxidation stage is passed over a bed in which the sulfur is removed by capillary absorption, the sulfur recovery percentage is increased to virtually 100.

The invention is illustrated in and by the following examples.

EXAMPLE I 4.784 g $Fe(NO_3)_3.9H_2O$ and 0.540 g $Cr(NO_3)_3.9H_2O$ are dissolved in a little demineralized $H_2O$. 3.9 g EDTA (ethylene diamine tetraacetic acid) is dissolved in a little 25% $NH_3$ solution. The two solutions are added to form a slurry. To this slurry 25% $NH_3$ solution is added until all of the slurry is dissolved and the pH has reached a value of 7. The colour of the solution is then blood red. Subsequently the total weight of the solution is made up with demineralized $H_2O$ to 20 g. Finally, 0.4 g HEC (hydroxyethylcellulose) is carefully added to this solution.

20 g alpha-$Al_2O_3$ (Fluka, powder 6.5 $m^2.g^{-1}$) is impregnated with the above solution. The total mass is stirred well for 15 minutes. Thereafter, the resulting catalyst is allowed to dry at room temperature for 48 hours and then at 120° C. for another 48 hours. The catalyst contains 4.5% by weight of $Fe_2O_3$ at 0.5% by weight of $Cr_2O_3$. Subsequently, catalyst pellets are pressed at 160 MPa. Of these pellets, a sieve fraction is made containing particles between 850 μm and 1000 μm, and this sieve fraction is calcined in air at the desired temperature. After calcination at 500° C. for 18 hours, the $N_2$ B.E.T. area of the catalyst is 6.94 $m^2.g^{-1}$ mercury. Porosimetry proves that less than 1% of the total pore volume is in pores having a radius less than 500 Å.

EXAMPLE II

A quartz reactor tube with a diameter of 1.2 cm is filled with 7.8 ml of a catalyst prepared according to Example I and calcined at 500° C. for 18 hours. On top of this catalyst a 4 cm-layer of quartz pieces of the same dimensions as the catalyst pellets is placed. A gas mixture consisting of $H_2S$, $O_2$, He and possibly $H_2O$ is passed through the reactor from the top downwards. The sulfur formed is condensed in the bottom part of the reactor at a temperature of 140° C. The $H_2O$ formed is then collected in a desiccant ($P_2O_5$ on $SiO_2$).

The results of the experiments are listed in the following table. All measurements have been carried out at a space velocity of 1000 $Nm^3/h.m^3$ catalyst.

It follows from the data specified in the table that the catalyst is little sensitive to an excess of $O_2$. Furthermore, 30% by volume of $H_2O$, present in the feedstock gas gives not a negative, but rather a positive effect on the total sulfur production.

| $H_2S$ (vol. %) | ratio $\frac{O_2}{H_2S}$ | $H_2O$ (Vol. %) | T (°C.) | $H_2S$ conversion (%) | sulfur selectivity(%) | sulfur yield (%) |
|---|---|---|---|---|---|---|
| 1 | 0.6 | 0 | 210 | 98 | 94 | 92 |
|   |     |   | 230 | 100 | 94 | 94 |
|   |     |   | 250 | 100 | 91 | 91 |
|   |     |   | 270 | 91 | 85 | 77* |
| 1 | 0.8 | 0 | 210 | 99 | 94 | 93 |
|   |     |   | 230 | 100 | 92 | 92 |
|   |     |   | 250 | 100 | 88 | 88 |
|   |     |   | 270 | 100 | 82 | 82 |
| 1 | 0.6 | 30 | 210 | 93 | 94 | 87 |
|   |     |    | 230 | 95 | 96 | 92 |
|   |     |    | 250 | 100 | 94 | 94 |
|   |     |    | 270 | 100 | 93 | 93 |
| 1 | 0.8 | 30 | 210 | 98 | 93 | 91 |
|   |     |    | 230 | 100 | 95 | 95 |
|   |     |    | 250 | 100 | 95 | 95 |
|   |     |    | 270 | 100 | 90 | 90 |

*This deviating value is obtained as a result of there being a relative oxygen deficit for the $H_2S$ oxidation.

COMPARATIVE EXAMPLE I

Of a CRS-31 catalyst, marketed by Rhône Poulenc, and used in both the Claus reaction and direct oxidation processes of hydrogen sulfide, a sieve fraction was made of particles having a diameter of between 850 and 1000 μm. Using 7.8 ml of this sieve fraction, the reactor is filled in the same way as described in Example II.

The catalyst has a total area of 146.5 $m^2g^{-1}$. Porosimetric measurements show that 90% or more of the total pore volume is in pores having a radius less than 500 Å.

The results of the reactor experiments are listed in the following table. All measurements have been made at a space velocity of 1000 $Nm^3/h.m^3$ catalyst. The feedstock gas consisted of 1% by volume of $H_2S$, 0.6-0.8% by volume of $O_2$, 0-30% by volume of $H_2O$ and He.

It follows from the data listed in the table that the CRS-31 catalyst is sensitive to an excess of $O_2$. Also, the presence of 30% by volume of $H_2O$ in the feedstock gas has a very negative effect on the total sulfur yield.

| $H_2S$ (Vol. %) | ratio $\frac{O_2}{H_2S}$ | $H_2O$ (Vol. %) | T (°C.) | $H_2S$ conversion (%) | sulfur selectivity(%) | sulfur yield (%) |
|---|---|---|---|---|---|---|
| 1 | 0.6 | 0 | 210 | 98 | 95 | 93 |
|   |     |   | 230 | 98 | 93 | 91 |
|   |     |   | 250 | 96 | 91 | 87 |
|   |     |   | 270 | 95 | 88 | 84 |
| 1 | 0.8 | 0 | 210 | 98 | 79 | 77 |
|   |     |   | 230 | 98 | 78 | 76 |
|   |     |   | 250 | 97 | 80 | 78 |
|   |     |   | 270 | 95 | 79 | 75 |
| 1 | 0.6 | 30 | 210 | 95 | 90 | 86 |
|   |     |    | 230 | 92 | 87 | 80 |
|   |     |    | 250 | 88 | 82 | 72 |
|   |     |    | 270 | 83 | 78 | 65 |
| 1 | 0.8 | 30 | 210 | 97 | 71 | 69 |
|   |     |    | 230 | 95 | 68 | 65 |
|   |     |    | 250 | 92 | 63 | 58 |
|   |     |    | 270 | 88 | 59 | 52 |

COMPARATIVE EXAMPLE II

A double-walled vessel having a capacity of 1.5 l is filled with 500 ml demineralized $H_2O$, in which 30 g gamma-$Al_2O_3$ (Harshaw Al-3-31-P) is suspended. The suspension is kept at a temperature of 38° C. by means of a water bath.

37.875 g of $Fe(NO_3)_3.9H_2O$ and 3.750 g of $Cr(NO_3)_3.9H_2O$ are dissolved in 500 ml of demineralized $H_2O$. The pH is adjusted to 1.3 with $HNO_3$. The solution last mentioned is pH-statically injected into the suspension of gamma-$Al_2O_3$ at a rate of 0.5 $ml.min^{-1}$. As a base, a 0.2M $NH_3$ solution is used.

After filtration, the catalyst is washed thrice with demineralized $H_2O$. Thereafter the catalyst is dried at 120° C. for 24 hours. Subsequently, catalyst pellets are pressed at 80 MPa. Of these tablets a sieve fraction is made with particles of between 850 μm and 1000 μm. This sieve fraction is calcined in air at 500° C. for 18 hours.

The catalyst contains 19.6% by weight of $Fe_2O_3$ and 1.9% by weight of $Cr_2O_3$.

The $N_2$ B.E.T. area is 253.6 $m^2.g^{-1}$. Porosimetry shows that 73% or more of the total pore volume is in pores having a radius less than 500 Å.

7.8 ml of this catalyst is used for reactor experiments. The reactor is filled as specified in Example II.

The results of the reactor experiments are summarized in the following table. All measurements have been made at a space velocity of 1000 $Nm^3/h.m^3$.

| $H_2S$ (Vol. %) | ratio $\frac{O_2}{H_2S}$ | $H_2O$ (Vol. %) | T (°C.) | $H_2S$ conversion (%) | sulfur selectivity(%) | sulfur yield (%) |
|---|---|---|---|---|---|---|
| 1 | 0.65 | 0 | 220 | 99 | 84 | 83 |
|   |      |   | 260 | 98 | 86 | 84 |
|   |      |   | 270 | 99 | 86 | 85 |
| 1 | 0.85 | 0 | 230 | 99 | 66 | 65 |
|   |      |   | 250 | 99 | 68 | 67 |

EXAMPLE III

As indicated in FIG. 1, the Claus reaction is carried out in a Claus plant having two catalytic stages.

Supplied to the thermal stage are a Claus gas containing 90% by volume of $H_2S$, corresponding to 90 kmoles/h, 5% by volume of $CO_2$ and 5% by volume of $H_2O$, as well as 45 kmoles/h of $O_2$ as air oxygen. The $H_2S$ % by volume in the residual gas after the second catalytic stage is 0.58, the $SO_2$ content therein is 0.29% by volume. After the conversion of all sulfur components to $H_2S$ in a hydrogenation stage, using a reducing $H_2/CO$ gas at 280° C., the gas, which contains a considerable quantity of water vapour is oxidized using the catalyst according to the invention as described in Example I.

The $H_2S$ percentage by volume in the output gas from the hydrogenation stage is 0.9, which corresponds to 2.5 kmoles/h; the $H_2O$ content therein is 35.8% by volume, corresponding to 98.9 kmoles/h. To the selective-oxidation stage, 2.0 kmoles/h $O_2$ is supplied in the form of air oxygen, corresponding to an $O_2:H_2S$ ratio of 0.8, i.e., an excess of oxygen of 60%. The gas to the selective-oxidation reactor is cooled to 180° C. In the selective-oxidation reactor, the $H_2S$ is fully converted at a bed temperature of 230° C.

The oxidation efficiency to elemental sulfur is 90%; the remainder is converted into $SO_2$. The resulting total sulfur recovery percentage in the overall system is 99.6. The effluent from the selective-oxidation stage is passed to the chimney via an after-burner.

EXAMPLE IV

Figure 2:
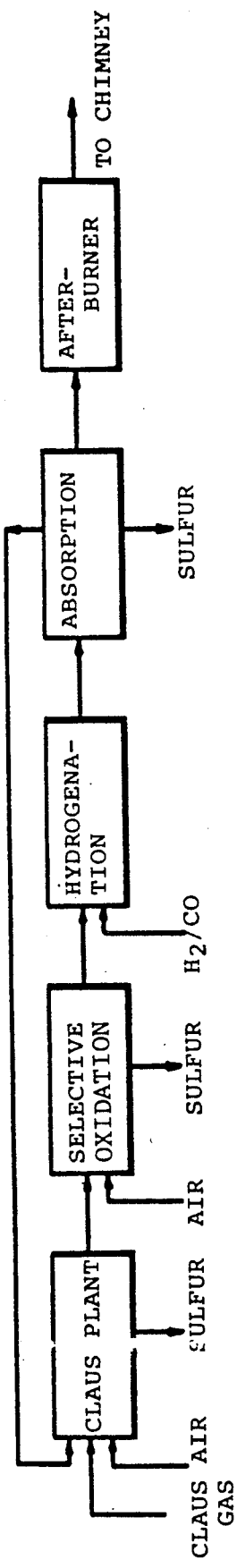

Using the equipment illustrated in FIG. 2, the Claus reaction is carried out in a Claus reactor, comprising two catalytic stages. Supplied to the thermal stage are a Claus gas containing 90% by volume of $H_2S$, corresponding to 90 kmoles/h, 5% by volume of $CO_2$ and 5% by volume of $H_2O$, as well as 44.22 kmoles/h of $O_2$, in the form of air oxygen. In addition, a quantity of gas of 10 kmoles/h containing 0.77 kmole/h of $SO_2$, from a dry-bed absorption stage, is circulated. In the residual gas from the Claus plant, the $H_2S$ concentration is 0.58% by volume, which corresponds to 1.58 kmoles/h; the $SO_2$ concentration is 0.29% by volume, corresponding to 0.79 kmole/h; and the $H_2O$ content therein is 35.8% by volume, corresponding to 98.9 kmoles/h. The residual gas is oxidized further, using the catalyst according to the invention as described in Example I. To the selective oxidation stage, 0.94 kmole/h $O_2$ is supplied in the form of air oxygen, which comes down to an $O_2:H_2S$ ratio of 0.6, an oxygen excess of 20%. The gas to the selective-oxidation reactor is heated to 195° C. In the selective-oxidation reactor, the $H_2S$ is fully converted at a bed temperature of 230° C. The oxidation efficiency to elemental sulfur is 90%; the balance is converted into $SO_2$. After condensation of the sulfur, the gas is mixed with a reducing $H_2/CO$ gas, heated to 280° C., and then supplied to the hydrogenation reactor.

All $SO_2$ in the gas and the remaining sulfur components are converted into $H_2S$. The gas is then passed over the dry-bed absorption stage. The reactors of the dry-bed absorption stage are filled with absorption mass as described in European patent application 71983. The $H_2S$ is absorbed to the absorption mass and in this way removed from the gas. The gas from the absorption stage flows to the after-burner and thence to the chimney. In order to maintain the system at the desired pressure during the regeneration of the absorption mass, a minor gas stream of 10 kmoles/h is bled off and recycled to the Claus plant.

In total, a sulfur recovery percentage of 99.9 is obtained.

EXAMPLE V

Figure 3:
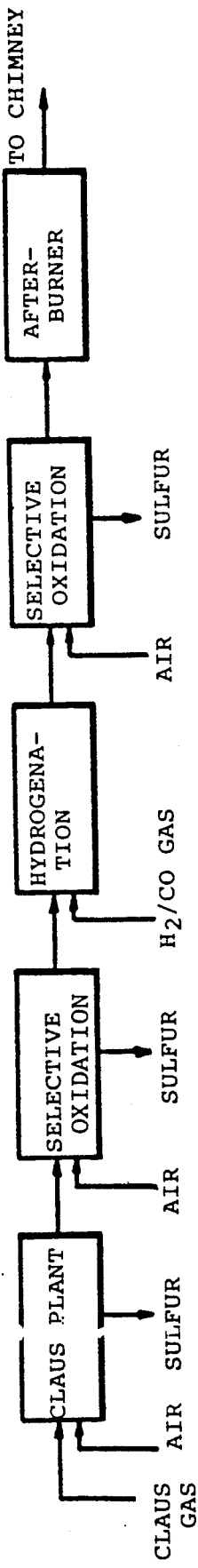

Using the apparatus as shown in FIG. 3, the Claus reaction is carried out in a Claus plant having two catalytic stages. Supplied to the thermal stage are a Claus gas containing 90% by volume of $H_2S$, corresponding to 90 kmoles/h, 5% by volume of $CO_2$ and 5% by volume of $H_2O$, as well as 45 kmoles/h of $O_2$ in the form of air oxygen. The $H_2S$ percentage by volume in the residual gas after the second catalytic stage is 0.58, which corresponds to 1.56 kmoles/h and the $SO_2$ content therein is 0.29% by volume, corresponding to 0.78 kmole/h. Using the catalyst according to the invention as described in Example I, the $H_2S$ in the gas is selectively oxidized to sulfur in the presence of a considerable concentration of water vapour.

The $H_2O$ content is 35.8% by volume, which corresponds to 98.9 kmoles/h. To the selective oxidation stage, 0.94 kmole/h of $O_2$ is supplied in the form of air oxygen, which comes down to an $O_2:H_2S$ ratio of 0.6, an oxygen excess of 20%. The gas to the selective-oxidation reactor is heated to 195° C. In the selective oxidation reactor, the $H_2S$ is fully converted at a bed temperature of 230° C.

The oxidation efficiency to elemental sulfur is 90%. The balance is converted to $SO_2$. After condensation of the sulfur formed, the gas is mixed with a reducing $H_2/CO$ gas, heated to 280° C., and subsequently supplied to the hydrogenation reactor. All $SO_2$ in the gas and the remaining sulfur components are converted into $H_2S$.

Subsequently, the gas is re-supplied to a selective oxidation stage, in which $H_2S$ is oxidized to sulfur, using the catalyst according to the invention as described in Example I. The $H_2S$ percentage by volume in this gas is 0.39, which corresponds to 1.1 kmoles/h; the $H_2O$ content therein is 35.9% by volume, which corresponds to 100 kmoles/h.

To the second selective oxidation stage, 0.88 kmoles/h of $O_2$ is supplied in the form of air oxygen, which corresponds to an $O_2:H_2S$ ratio of 0.8, an excess of oxygen of 60%.

The gas to the second selective-oxidation reactor is cooled to 250° C. In the second-selective oxidation reactor, the $H_2S$ is again fully converted at a bed temperature of 230° C.

The oxidation efficiency of $H_2S$ to elemental sulfur in the second stage is 90%; the balance is converted to $SO_2$.

As a result a total sulfur recovery percentage of 99.8 is obtained in the overall system. The effluent gas is discharged to the chimney via the after-burner.

EXAMPLE VI

Figure 4:
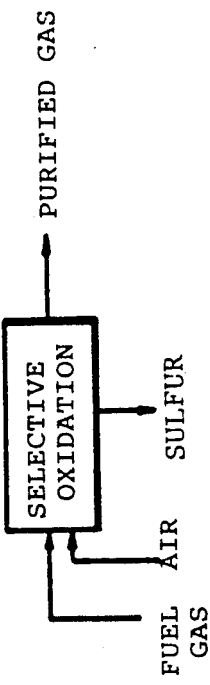

Using the apparatus as shown in FIG. 4, a quantity of 5000 $Nm^3/h$ fuel gas is supplied to a catalyst according to the present invention, as described in Example I. The fuel gas contains 63% by volume of $CH_4$, 31% by volume of $CO_2$, 1% by volume of $H_2S$ and 5% by volume of $H_2O$.

To the selective-oxidation stage, 30 $Nm^3/h$ of $O_2$ is supplied in the form of air oxygen, corresponding to an $O_2:H_2S$ ratio of 0.6, and an oxygen excess of 20%. The gas to the selective-oxidation reactor is heated to 180° C. The $H_2S$ is fully converted at a bed temperature of 240° C. The oxidation efficiency to elemental sulfur is 92%; the balance is converted to $SO_2$. After condensation of the sulfur formed, the gas is discharged. The sulfur recovery percentage is 92.

EXAMPLE VII

Incoloy 825 metal chips are boiled for 2 hours in a 5% $NH_4OH$ solution. Thereafter the chips are thoroughly washed in demineralized water and subsequently calcined in air at 500° C. for 24 hours.

0.39 g $H_4EDTA$ (ethylene diamino tetraacetic acid) is dissolved in about 20 ml $H_2O$ and adjusted to pH7 with $NH_3$. To this solution 0.46 g $Fe(NO_3)_3.9H_2O$ is added, and the pH is re-adjusted to 7 using $NH_3$. Now 0.125 g of HEC (hydroxyethyl cellulose) and 0.25 g agar are added. The weight of this impregnation liquid is made up to 50 g by means of $H_2O$. The solution is boiled for 1 minute.

36.1 g of the washed and calcined metal chips are impregnated with 10 ml of the above impregnation liquid. Thereafter the catalyst is dried in vacuo at 20° C. for 64 hours. Finally, the iron complex is converted into active iron oxide by calcining in air at 500° C. for 24 hours. The iron oxide load of the catalyst is then 0.125% by weight.

EXAMPLE VIII

A cylindrical quartz reactor (diameter 12 mm) is filled with 7.8 ml of a catalyst prepared in accordance with Example VII. A gas mixture consisting of hydrogen sulfide, oxygen and helium is passed through the reactor from the top downwards. To ensure proper admixture of the reactants in the reactor, a layer 4 cm thick of quartz lumps has been placed on top of the catalyst. The sulfur formed is condensed in the bottom portion of the reactor at a temperature of 140° C. The resulting water is collected afterwards in a desiccant. This desiccant is phosphorus pentoxide on silica. The remaining gas stream, containing sulfur dioxide, helium and possibly hydrogen sulfide and oxygen, is quantitatively analyzed on a gas chromatograph.

The results of the experiments are collected in the following table. All measurements have been made at a space velocity of 1150 $Nm^3/h.m^3$ catalyst. The input concentrations of hydrogen sulfide and oxygen were 1.0% by volume and 0.8% by volume, respectively.

| temperature reactor (°C.) | activity (%) | selectivity (%) |
|---|---|---|
| 250 | 43.3 | 95.2 |
| 282 | 93.7 | 85.5 |
| 303 | 100.0 | 79.2 |
| 315 | 100.0 | 71.0 |

The activity is defined as the conversion of hydrogen sulfide. The selectivity is the quantity of sulfur formed from the converted hydrogen sulfide.

What we claim is:

1. A process for the selective oxidation of sulfur containing compounds to form elemental sulfur, comprising passing a hydrogen sulfide containing gas together with an oxygen containing gas, at a temperature of at least 150° C., over a catalyst which comprises
   a carrier of which the surface exposed to the gaseous phase does not exhibit alkaline properties under the reaction conditions, and
   a catalytically active material applied thereto or formed thereon,
   the specific surface area of the catalyst being less than 20 $m^2/g$ catalyst, with less than 10% of the total pore volume being constituted by pores having a pore radius between 5 and 500 Å;
   said catalyst being ineffective to establish the Claus equilibrium.

2. A process as claimed in claim 1, wherein the molar ratio of oxygen to hydrogen sulfide is maintained between 0.5 and 1.

3. A process as claimed in claim 1, wherein $H_2S$ is the only sulfur containing compound which is oxidized to sulfur.

* * * * *

UNITED STATES PATENT AND TRADEMARK OFFICE
CERTIFICATE OF CORRECTION

PATENT NO. : 5,037,629

DATED : August 6, 1991

INVENTOR(S) : Pieter H. Berben, et al.

It is certified that error appears in the above-identified patent and that said Letters Patent is hereby corrected as shown below:

On the title page, item (75) after Inventors: "Ziest" should read --Zeist--.

Column 8, line 49, "6.5 $m^2.g$" should read --6.5 $m^2g$--.

Signed and Sealed this

Thirteenth Day of April, 1993

Attest:

STEPHEN G. KUNIN

*Attesting Officer*          *Acting Commissioner of Patents and Trademarks*